United States Patent
McCumber et al.

(10) Patent No.: US 11,505,325 B2
(45) Date of Patent: Nov. 22, 2022

(54) AUTOMATIC EJECTION SEAT PERFORMANCE AND ACCOMMODATION OPTIMIZATION BASED ON CONNECTOR

(71) Applicant: AMI Industries, Inc., Colorado Springs, CO (US)

(72) Inventors: Ronald John McCumber, Colorado Springs, CO (US); Casey Andrew Stribrny, Colorado Springs, CO (US); Nicholas K. Bharucha, Colorado Springs, CO (US); John Hampton, Colorado Springs, CO (US); Kassidy L. Carson, Colorado Springs, CO (US); Bradley Mastrolia, Colorado Springs, CO (US); Steve Holstine, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 93 days.

(21) Appl. No.: 17/036,336

(22) Filed: Sep. 29, 2020

(65) Prior Publication Data
US 2022/0097860 A1 Mar. 31, 2022

(51) Int. Cl.
*B64D 25/10* (2006.01)
*B64C 19/00* (2006.01)

(52) U.S. Cl.
CPC .............. *B64D 25/10* (2013.01); *B64C 19/00* (2013.01)

(58) Field of Classification Search
CPC .................................................... B64D 25/10
See application file for complete search history.

(56) References Cited

U.S. PATENT DOCUMENTS

| 3,706,434 | A | * | 12/1972 | Martin | .................. | B64D 25/10 |
|---|---|---|---|---|---|---|
| | | | | | | 244/122 AD |
| 4,673,147 | A | | 6/1987 | Solomonides | | |
| 4,846,421 | A | | 7/1989 | Trikha | | |
| 5,558,301 | A | | 9/1996 | Kerdoncuff et al. | | |

(Continued)

FOREIGN PATENT DOCUMENTS

| CN | 107804468 | 3/2019 |
|---|---|---|
| CN | 109573051 | 4/2019 |

(Continued)

OTHER PUBLICATIONS

European Patent Office; European Search Report dated Feb. 23, 2022 in Application No. 21198208.7.

(Continued)

*Primary Examiner* — Richard G Davis
(74) *Attorney, Agent, or Firm* — Snell & Wilmer L.L.P.

(57) ABSTRACT

A system for automatic optimization of an ejection system for an aircraft includes the ejection system having a plurality of adjustable settings and having a plurality of components. The system further includes a connector configured to connect to a component of the plurality of components and having a connector portion that includes information corresponding to a user of the ejection system. The system further includes a controller coupled to the ejection system and configured to adjust at least one of the plurality of the adjustable settings of the ejection system based on the information corresponding to the user of the ejection system.

18 Claims, 7 Drawing Sheets

(56) References Cited

U.S. PATENT DOCUMENTS

| | | | |
|---|---|---|---|
| 6,254,126 B1 | 7/2001 | Bauer et al. | |
| 8,276,845 B2 | 10/2012 | Orgerie et al. | |
| 8,594,868 B2 | 11/2013 | Kell | |
| 9,523,985 B1 * | 12/2016 | Barnes | G05D 1/0653 |
| 10,410,075 B2 | 9/2019 | Zebley et al. | |
| 10,543,798 B2 * | 1/2020 | Desjardins | B64D 25/04 |
| 10,546,274 B2 * | 1/2020 | Jobling | G06Q 10/025 |
| 11,300,078 B2 | 4/2022 | Benjamin | |
| 2008/0156602 A1 | 7/2008 | Hiemenz | |
| 2011/0035118 A1 | 2/2011 | Hiemenz | |
| 2015/0217780 A1 | 8/2015 | Chen et al. | |
| 2017/0106981 A1 | 4/2017 | Bolukbasi et al. | |
| 2018/0162539 A1 | 6/2018 | Azizi Pourzadeh | |
| 2019/0266472 A1 | 8/2019 | Johnson | |
| 2020/0096072 A1 | 3/2020 | Kawecki | |
| 2020/0189756 A1 | 6/2020 | Salois et al. | |

FOREIGN PATENT DOCUMENTS

| | | |
|---|---|---|
| EP | 3798120 | 3/2021 |
| GB | 959900 | 6/1964 |
| RU | 2671896 | 11/2018 |
| WO | 2013120142 | 8/2013 |

OTHER PUBLICATIONS

European Patent Office; European Search Report dated Feb. 11, 2022 in Application No. 21199831.5.

European Patent Office; European Search Report dated Feb. 23, 2022 in Application No. 21198332.5.

European Patent Office; European Search Report dated Feb. 11, 2022 in Application No. 21199112.0.

USPTO; Pre-Interview OA dated in Mar. 25, 2022 in U.S. Appl. No. 17/036,391.

USPTO; Pre-Interview Office Action dated Jul. 12, 2022 in U.S. Appl. No. 17/036,229.

USPTO; Notice of Allowance dated Aug. 11, 2022 in U.S. Appl. No. 17/036,229.

USPTO; Notice of Allowance dated Aug. 11, 2022 in U.S. Appl. No. 17/036,391.

* cited by examiner

AUTOMATIC EJECTION SEAT PERFORMANCE AND ACCOMMODATION OPTIMIZATION BASED ON CONNECTOR

FIELD

The present disclosure relates to ejection systems for aircraft and, more particularly, to automatic optimization of such ejection systems based on use of a connector.

BACKGROUND

Certain aircraft may include ejection systems designed to eject a member of the flight crew from the aircraft in certain situations. These ejection systems typically include an ejection seat in which the member of the flight crew is located during flight. The ejection seat may have various adjustable settings which are desirable to adjust based on parameters and preferences of the ejection seat and/or flight crew member. For example, the ejection seat may have settings related to timing of ejection, deployment of parachutes, adjustments to dimensions (e.g., lumbar support, seat height, headrest position), or the like. Currently, these settings are manually input during a pre-flight check. However, this is a time-consuming process as each setting is adjusted manually and separate from many other settings.

SUMMARY

Disclosed herein is a system for automatic adjustment of an ejection system for an aircraft. The system includes the ejection system having a plurality of adjustable settings and having a plurality of components. The system further includes a connector configured to connect to a component of the plurality of components and having a connector portion that includes information corresponding to a user of the ejection system. The system further includes a controller coupled to the ejection system and configured to adjust at least one of the plurality of the adjustable settings of the ejection system based on the information corresponding to the user of the ejection system.

In any of the foregoing embodiments, the connector includes a plurality of pins and the connector portion includes at least one pin of the plurality of pins such that a configuration of the at least one pin indicates the information corresponding to the user.

In any of the foregoing embodiments, the controller is configured to: determine an identifier of the user based on the at least one pin; retrieve specific settings of the user by accessing a database using the identifier; and adjust the at least one of the plurality of the adjustable settings based on the specific settings of the user retrieved from the database.

In any of the foregoing embodiments, the controller is configured to: determine at least one physical characteristic of the user based on the at least one pin; and adjust the at least one of the plurality of the adjustable settings based on the at least one physical characteristic of the user.

In any of the foregoing embodiments, the at least one physical characteristic includes at least one of a weight of the user, a gender of the user, a distance measurement of the user, or a location of a center of gravity of the user.

In any of the foregoing embodiments, the controller is configured to: determine at least one specific setting corresponding to the user based on the at least one pin; and adjust the at least one of the plurality of the adjustable settings based on the at least one specific setting.

In any of the foregoing embodiments, the at least one pin of the connector portion includes a set of pins such that a specific combination of logical ones and zeros corresponding to a present pin or a lacking pin, respectively, of the set of pins indicates the information corresponding to the user.

In any of the foregoing embodiments, the connector is included as a part of a portable component of the ejection system such that the connector and the portable component are transported by the user.

In any of the foregoing embodiments, the connector is configured to be used between the component and a second component of the plurality of components such that the connector is transported by the user.

In any of the foregoing embodiments, the connector is configured for use with at least one of an oxygen mask, a helmet, a harness fitting, or a communication system.

In any of the foregoing embodiments, at least one of: the ejection system includes a seat electronic sequencer and the plurality of the adjustable settings include at least one of a parachute deployment timing, a drogue deployment timing, or a thrust angle alignment; the ejection system includes a seat electronic position controller and the plurality of the adjustable settings include at least one of a seat height, a lumbar support, a headrest position, a rail angle, or an actuator position; or the ejection system includes an interseat electronic sequencer and the plurality of the adjustable settings include an interseat timing.

Also disclosed is a system for automatic adjustment of an ejection system for an aircraft. The system includes the ejection system having a plurality of adjustable settings and having a plurality of components. The system further includes a connector having a plurality of pins and configured to connect to a component of the plurality of components and having a connector portion having a set of pins such that a specific combination of logical ones and zeroes corresponding to a present pin or a lacking pin, respectively, of the set of pins indicates information corresponding to a user of the ejection system. The system further includes a controller coupled to the ejection system and configured to adjust at least one of the plurality of the adjustable settings of the ejection system based on the information corresponding to the user of the ejection system.

In any of the foregoing embodiments, the connector is configured for use with at least one of an oxygen mask, a helmet, a harness fitting, or a communication system.

Also disclosed is a method for automatic adjustment of an ejection system for an aircraft. The method includes connecting a connector to a component of a plurality of components of the ejection system. The method further includes determining, by a controller, information corresponding to a user of the ejection system based on a connector portion of the connector. The method further includes adjusting, by the controller, at least one of a plurality of adjustable settings of the ejection system based on the information corresponding to the user of the ejection system.

In any of the foregoing embodiments, determining the information corresponding to the user of the ejection system includes determining the information based on a configuration of at least one pin of the connector portion of the connector.

Any of the foregoing embodiments may further include retrieving, by the controller, specific settings of the user by accessing a database using an identifier of the user, wherein: determining the information corresponding to the user includes determining the identifier of the user based on the at least one pin; and adjusting the at least one of the plurality of the adjustable settings is based on the specific settings of the user.

In any of the foregoing embodiments: determining the information corresponding to the user includes determining at least one physical characteristic of the user based on the at least one pin; and adjusting the at least one of the plurality of the adjustable settings is based on the at least one physical characteristic of the user.

In any of the foregoing embodiments: determining the information corresponding to the user includes determining at least one specific setting corresponding to the user based on the at least one pin; and adjusting the at least one of the plurality of the adjustable settings is based on the at least one specific setting.

In any of the foregoing embodiments, determining the information based on the configuration of the at least one pin includes determining the information based on a specific combination of logical ones and zeros corresponding to a present pin or a lacking pin, respectively, of a set of pins of the connector portion of the connector.

In any of the foregoing embodiments, connecting the connector includes connecting the connector to at least one of an oxygen mask, a helmet, a harness fitting, or a communication system.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
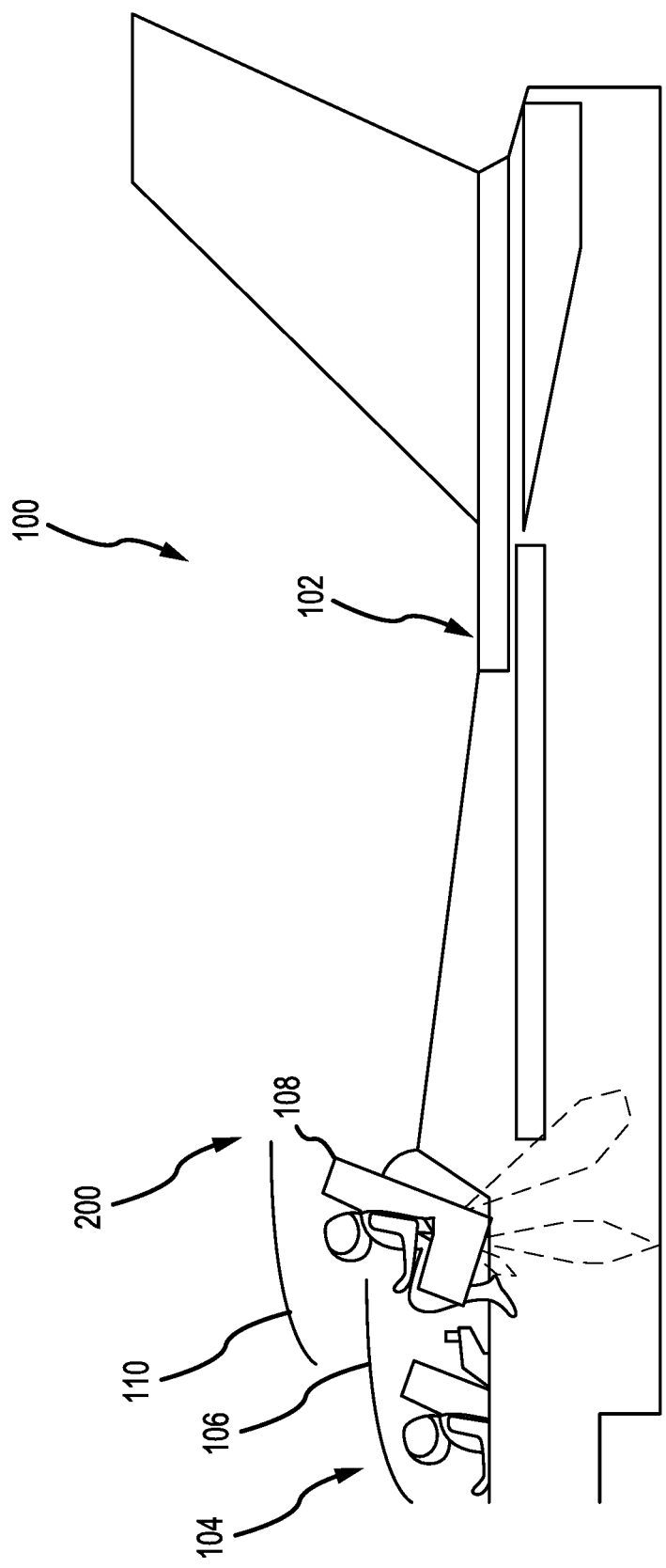
FIG. 1 illustrates an aircraft having two cockpits with respective ejection systems and a system for adjusting settings of the ejection systems, in accordance with various embodiments.

Referring now to FIG. 1, an aircraft 100 may include a fuselage 102. The fuselage 102 may define or include a cockpit 104 in which one or more member of a flight crew may be located. The fuselage 102 may further define or include a second cockpit 108 in which one or more member of a flight crew may be located. In various embodiments, the cockpit 104 may include one or more ejection system to facilitate ejection of one or more member of the flight crew. In that regard, the first cockpit 104 may include a hatch or canopy 106 that separates from or moves relative to the first cockpit 104 to allow the member or members of the flight crew in the first cockpit 104 to eject from the fuselage 102. The second cockpit 108 may further include a hatch or canopy 110 that separates from or moves relative to the second cockpit 108 to allow the member or members of the flight crew in the second cockpit 108 to eject from the fuselage 102. The aircraft 100 may be a passenger aircraft, a cargo aircraft, a military aircraft, or the like.

Figure 2B:
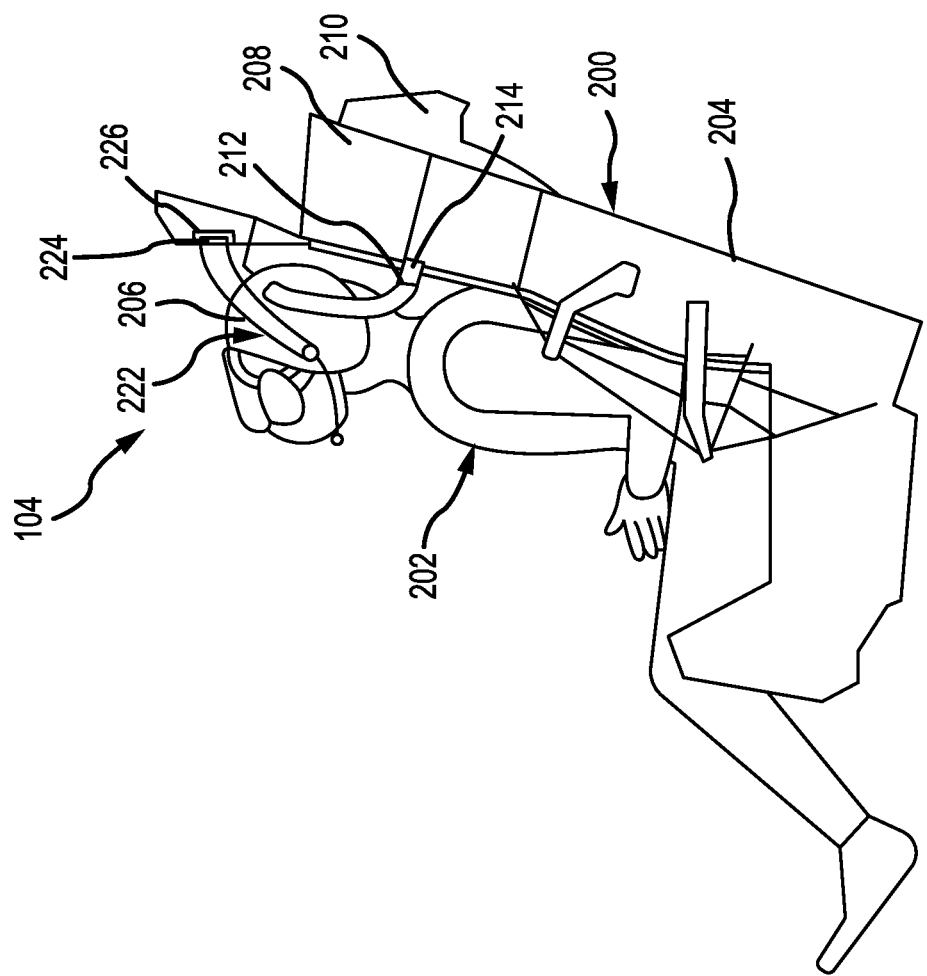
FIGS. 2A and 2B illustrate a front view and a side view, respectively, of various features of an ejection system including an ejection seat, in accordance with various embodiments.
Figure 2A:
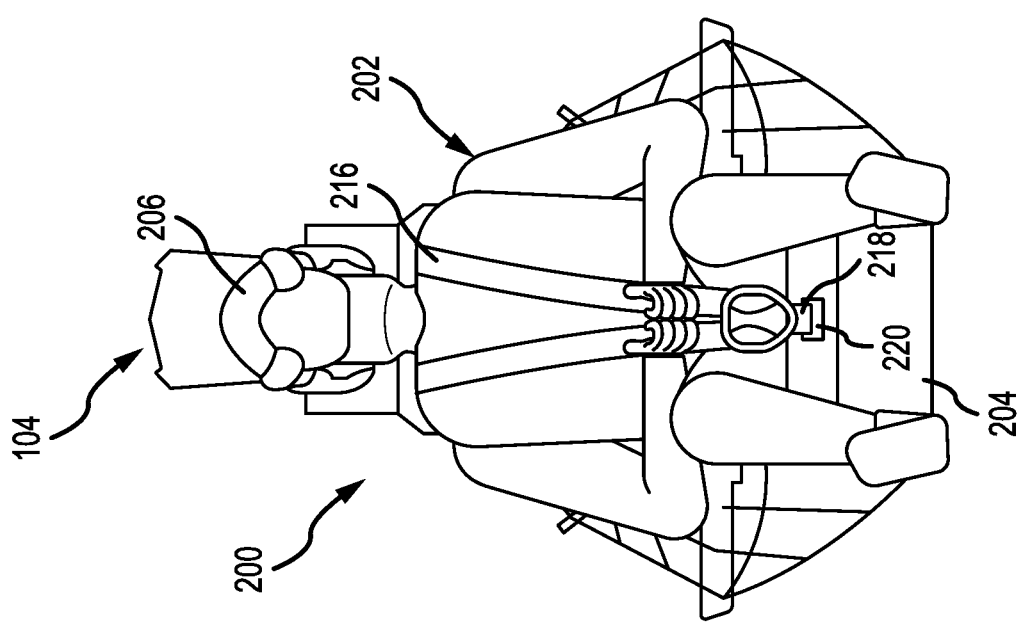
Figures 3A, 3B:
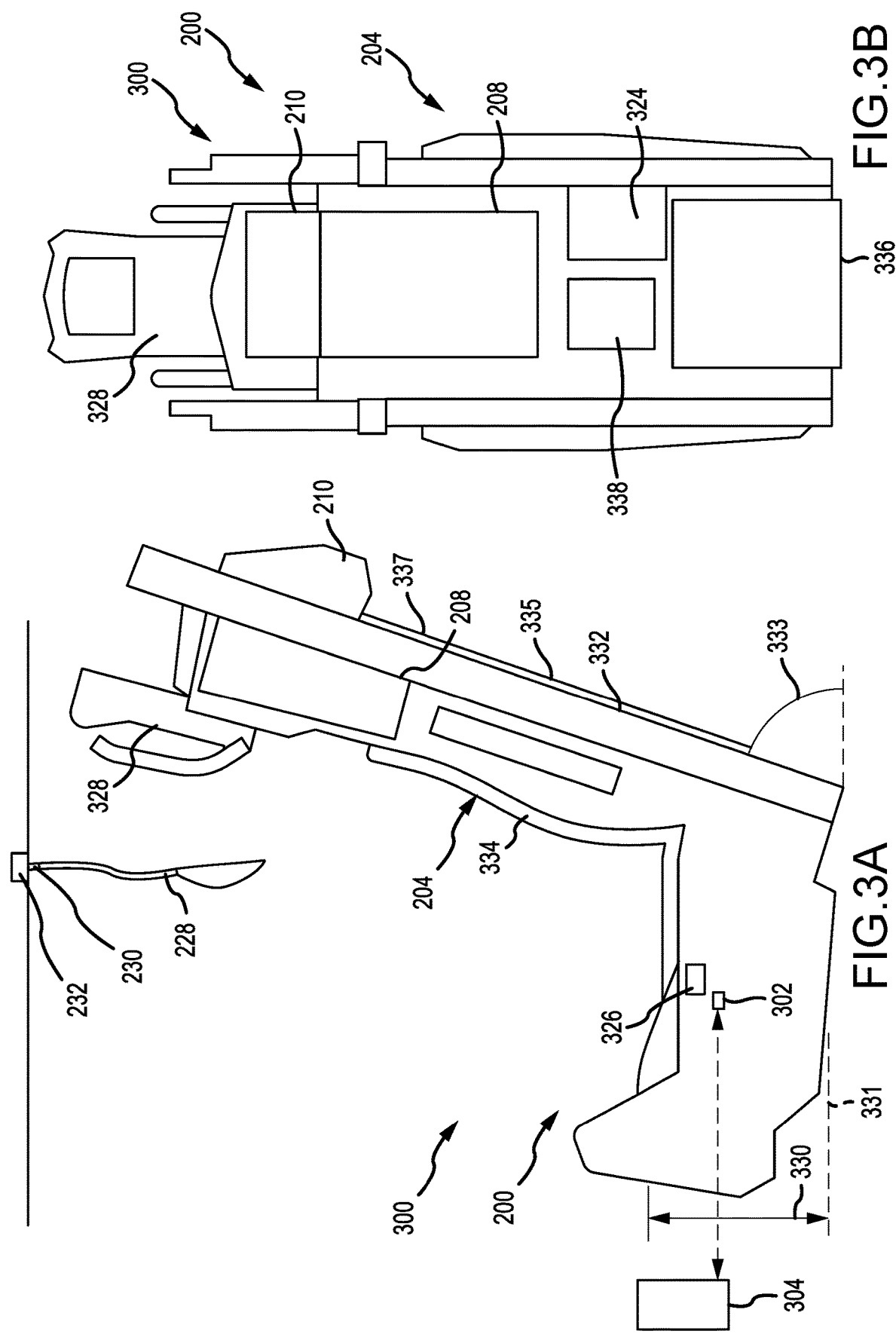
FIGS. 3A and 3B are side and back views, respectively, of the ejection seat of FIGS. 2A and 2B, in accordance with various embodiments.

Referring now to FIGS. 2A and 2B, an exemplary ejection system 200 may be included in the cockpit 104. In particular, the ejection system 200 may include a seat 204 on which a user 202 may sit or otherwise rest and a helmet 206 which may be supported on a head of the user 202. The seat 204 may include various components of the ejection system 200 such as a main parachute 208 and a drogue 210. The seat 204 may further include a catapult or rocket that ejects the seat 204 and any occupant thereof from the cockpit 104. The drogue 210 may be a parachute that initially deploys after ejection of the seat 204 and may reduce a velocity of the seat 204 as it travels towards a ground surface. The main parachute 208 may deploy after the drogue 210 and may provide further reduction of the velocity of at least one of the seat 204 or the user 202 as it travels towards the ground surface.

Referring now to FIGS. 2A, 2B, 3A, and 3B, a system 300 may automatically adjust features of the ejection system 200 based on information available via a connector used in the cockpit 104. The system 300 may include a controller 302. The controller 302 may include one or more logic devices such as one or more of a central processing unit (CPU), an accelerated processing unit (APU), a digital signal processor (DSP), a field programmable gate array (FPGA), an application specific integrated circuit (ASIC), or the like. In various embodiments, the controller 302 may further include any non-transitory memory known in the art. The memory may store instructions usable by the logic device to perform operations.

The system 300 may further include a database or remote memory 304. The database 304 may be located on a same aircraft as the system 300 or may be located remote from the aircraft. The controller 302 may communicate with the database 304 via any wired or wireless protocol. In that regard, the controller 302 may access data stored in the database 304. The database 304 may store identifiers associated with users of the system 300 and may store specific settings for various components of the ejection system 200 that are associated with each of the user identifiers. For example, a first user identifier may be associated with a first set of settings for the ejection system 200 and a second user identifier may be associated with a second set of settings for the ejection system 200. The controller 302 may access the specific settings for each user identifier by comparing the user identifier to the database 304.

The system 300 may include various components that are removably coupled to other components in the cockpit 104. For example, the system may further include a harness fitting 216 that restrains the user 202 in the seat 204. A harness connector 218 may be coupled between the harness fitting 216 and a connector 220 of the seat 204. The harness connector 218 may be removably coupled to both of the harness fitting 216 and the connector 220 such that the user 202 may carry the harness connector 218 with him between aircraft. In various embodiments, the harness fitting 216 may be removably coupled to the aircraft (and the harness connector 218 permanently or removably coupled to the harness fitting 216) such that the user 202 may carry the harness fitting 216, with the harness connector 218, with him between aircraft.

The helmet 206 may likewise be included in the system 300 and may include a helmet connector 212 that connects the helmet 206 to a connector 214 in the seat 204 or another portion of the cockpit 104. For example, digital or analog data may be transmitted between the helmet 206 and various components of the cockpit 104 via the helmet connector 212 and the connector 214. The helmet connector 212 may be removably coupled to both of the helmet 206 and the connector 214 such that the user 202 may carry the helmet connector 212 with him between aircraft. In various embodiments, the helmet connector 212 may be permanently or removably coupled to the helmet 206 such that the user 202 may carry the helmet 206, with the helmet connector 212, with him between aircraft.

The system 300 may also include a communication system 222 which may include any one or more of a speaker, a microphone, a radio or other device capable of wireless or wired transmissions. In various embodiments, the communication system 222 may be integrated with the helmet 206. A communication connector 224 may be coupled between a component of the communication system 222 (e.g., a headset, a radio, a transmitter, or the like) and a connector 226 coupled to the seat 204 or another portion of the cockpit 200. The communication connector 224 may be removably coupled to both of the component of the communication system 222 and the connector 226 such that the user may carry the communication connector 224 with him between aircraft. In various embodiments, a component of the communication system 222 may be removably coupled to the aircraft (and the communication connector 224 permanently or removably coupled to the component of the communication system 222) such that the user may carry the component of the communication system (with the communication connector 224) with him between aircraft.

The system 300 may further include an oxygen mask 228. The oxygen mask may deploy in response to at least one of a lack of pressure in the cockpit 104 or another trigger in order to provide a flow of oxygen to the user 202. In various embodiments, the oxygen mask 228 may integrated with the helmet 206. An oxygen connector 230 may be coupled between the oxygen mask 228 and a connector 232 of the seat 204 or another portion of the cockpit 104. The oxygen connector 230 may be removably coupled to both of the oxygen mask 228 and the connector 232 such that the user may carry the oxygen connector 230 with him between aircraft. In various embodiments, the oxygen mask 228 may be removably coupled to the aircraft (and the oxygen connector 230 permanently or removably coupled to the oxygen mask 228) such that the user may carry the oxygen mask 228 (with the oxygen connector 230) with him between aircraft.

Each of the helmet connector 212, the harness connector 218, the communication connector 224, and the oxygen connector 230 may communicate with the controller 302 (e.g., either via the respective connectors 214, 220, 226, 232 or via the helmet 206, the harness fitting 216, the communication system 222, or the oxygen mask 228, respectively). At least one of the helmet connector 212, the harness connector 218, the communication connector 224, and the oxygen connector 230 may include a connector portion (e.g., a set of pins, a portable memory integrated in the respective connector, or any other digital or analog feature) which includes information corresponding to the user 202. In that regard, the controller 302 may determine or identify information corresponding to the user 202 by analyzing the connector portion of the respective connector (which is carried by the user 202 between aircraft). Thus, the information corresponding to the user 202 may be automatically learned by a controller of a cockpit of any aircraft with a system similar to the system 300 by analyzing the connector portion of the respective connector. The information corresponding to the user 202 may include physical characteristics of the user 202, information usable to determine an identifier of the user 202, specific settings for components of the ejection system 200, or the like.

The controller 302 may adjust various settings of the ejection system 200 based on the information corresponding to the user 202. The controller 302 may directly control the various settings of the ejection system 200 or may provide instructions to components of the ejection system 200 and those components may adjust the settings. For example, the ejection system 200 may include a seat electronic sequencer 324, a seat electronic position controller 326, an interseat electronic sequencer 338, and the like. Each of the seat electronic sequencer 324, the seat electronic position controller 326, and the interseat electronic sequencer 338 may include one or more logic devices such as one or more of a central processing unit (CPU), an accelerated processing unit (APU), a digital signal processor (DSP), a field programmable gate array (FPGA), an application specific integrated circuit (ASIC), or the like. In various embodiments, these elements may further include any non-transitory memory known in the art. The seat electronic sequencer 324, the seat electronic position controller 326, and the interseat electronic sequencer 338 may be coupled to the controller 302 and may receive the specific settings from the controller 302 or may receive instructions regarding adjustments of components of the ejection system 200 from the controller 302.

The seat electronic sequencer 324 may make adjustments to components of the ejection system 200 that alter a sequence or timing of ejection events such as settings associated with the drogue 210, the main parachute 208, and a thrust angle of the seat 204 during ejection. For example, the seat electronic sequencer 324 may set a parachute deployment timing corresponding to a delay between ejection and deployment of the main parachute 208. The seat electronic sequencer 324 may further set a drogue deployment timing corresponding to a delay between ejection and deployment of the drogue 210. The seat electronic sequencer 324 may further adjust the angle 333 of the seat 204 relative to the fuselage 102 of FIG. 1 during ejection of the seat 204 from the cockpit 104.

The seat electronic position controller 326 may make adjustments to components of the ejection system 200 that affect a position of a user within the system 200 such as positions of various elements of the seat 204. For example, the seat electronic position controller 326 may adjust a position of a headrest 328 (e.g., in any two or more directions corresponding to a front of an aircraft, a rear of an aircraft, closer to a floor surface 331, farther from the floor surface 331, towards a starboard side, and towards a port side). The seat electronic position controller 326 may further control a seat height actuator 336 to adjust a seat height 330 of the seat 204 (e.g., to increase or decrease the seat height 330). The seat electronic position controller 326 may further adjust a rail angle 333 corresponding to an angle between seat rails 332 and the floor surface 331. The seat electronic position controller 326 may further adjust a lumbar support 334 to extend closer to or farther from a surface 335 of a backrest 337.

The interseat electronic sequencer 338 may make adjustments to components of the ejection system 200 that affect an interseat timing between components. For example, the interseat electronic sequencer 338 may adjust a timing or delay between ejection of the seat 204 and separation of at least one of a hatch or canopy (e.g., the hatch or canopy 106, 110 of FIG. 1) from the respective fuselage, or adjust a delay between ejection of two or more cockpits (e.g., between the first cockpit 104 and the second cockpit 108 of FIG. 1). For example, it may be desirable for a different timing to be used for a heavier user relative to a lighter user. The interseat electronic sequencer 338 may select an order of ejection between two or more cockpits based on the specific settings of two or more users. As another example, it may be desirable for a different timing to be used for a heavier user relative to a lighter user. In that regard, the interseat electronic sequencer 338 may select a timing for a user to eject relative to separation of a hatch or canopy from a fuselage based on the specific settings of the user or the physical characteristics of the user.

As alluded to above, the various adjustable settings of the ejection system 200 may vary based on at least one of physical characteristics of a user or user preferences. In that regard, the specific settings of the user stored in the database 304 or stored in the connector portion of the respective connector (i.e., at least one of the helmet connector 212, the harness connector 218, the communication connector 224, and the oxygen connector 230) may include at least one of physical characteristics of the user or specific user preferences. The controller 302 or one or more of the seat electronic sequencer 324, the seat electronic position controller 326, or the interseat electronic sequencer 338 may select values for the various adjustable settings based on the one or more of the physical characteristics of the user or the user preferences. For example, the physical characteristics may include at least one of a weight of the user, a gender of the user, a sitting height of the user (e.g., a length of at least one of a torso or a head of the user), a location of a center of gravity of the user relative to other parts of the body of the user, a reach of the user (e.g., corresponding to at least one of an arm length or a leg length of the user), or the like. In various embodiments, the physical characteristic may include a distance measurement of the user such as a height of the user, the sitting height of the user, the reach of the user, or the like.

In various embodiments, the specific settings of the user stored in the database 304 or stored in the connector portion of the respective connector may include specific values of the adjustable settings instead of, or in addition to, the physical characteristics or the user preferences. In that regard, the controller 302 may adjust the settings of the ejection system 200 based on the specific settings of the user 202.

In various embodiments, the connector portion of the respective connector may include an identifier of the user 202. The controller 302 may retrieve the specific settings of the user 202 from the database 304 using the identifier.

Figure 4:
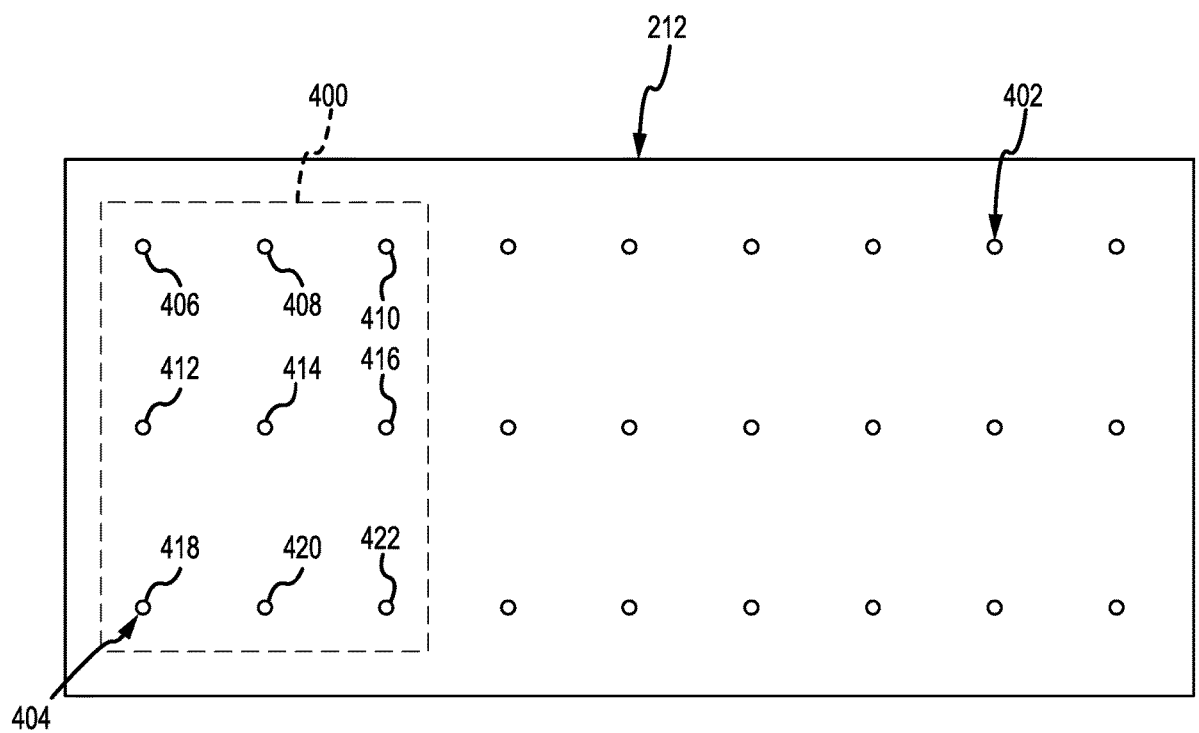
FIG. 4 is a drawing of a connector having a connector portion with a set of pins usable to determine information corresponding to a user of the ejection system of FIGS. 2A and 2B, in accordance with various embodiments.

Referring now to FIG. 4, various features of the helmet connector 212 are shown to illustrate how a connector portion 400 of the helmet connector 212 can be used to determine an identifier of a user, physical characteristics of the user, or specific settings of the user. The connector 212 may include a plurality of pins 402 extending away from the helmet connector 212. In various embodiments, the plurality of pins 402 may include pins, contact pads, sockets, or any other connector along which electrical signals may be transmitted. The plurality of pins 402 may transmit and receive electrical information to and from the helmet 206 of FIGS. 2A and 2B.

The connector portion 400 (which includes the information related to the user) may include a set of pins 404 of the plurality of pins 402. The set of pins 404 may include at least one pin. In various embodiments, the connector portion 400 may further include a non-transitory memory 405 which stores the information related to the user. In such embodiments, the information from the memory 405 may be transmitted directly or indirectly to the controller 302 via the set of pins 404.

In various embodiments, each of the set of pins 404 may represent a logical one or a logical zero, depending upon whether a given pin is present. For example, the set of pins 404 may include nine pins 406, 408, 410, 412, 414, 416, 418, 420, 422). Each pin (e.g., the pin 406) may represent a logical zero in response to the pin being removed from the connector portion 400 (including being adjusted so it fails to make contact with a respective connector) and may represent a logical one in response to the pin being present (and able to make contact with a respective connector). In that regard, the set of pins 404 may represent information corresponding to the user. For example, a first combination of logical values of the pins 406, 408, 410, 412, 414, 416, 418, 420, 422, respectively, may be 100110010 and a second combination of logical values of the pins 406, 408, 410, 412, 414, 416, 418, 420, 422, respectively, may be 100110011. The first combination of logical values may represent a first user identifier and the second combination of logical values may represent a second user identifier.

As another example, the pins 406, 408, 410, 412, 414, 416, 418, 420, 422 may be grouped such that each grouping represents a different physical characteristic. For example, the pins 406, 408, 410 may represent a weight of the user (e.g., 110 may represent a weight between 150 and 165 pounds), the pins 412, 414, 416 may represent a height of the user (e.g., 101 may represent a height of between 5 feet 10 inches and 6 feet), and the pins 418, 420, 422 may represent a reach of the user (e.g., 011 may represent an arm length of between 3 feet and 3 feet 4 inches).

As yet another example, the pins 406, 408, 410, 412, 414, 416, 418, 420, 422 may represent specific settings of the user. For example, a combination of logical values of the pins 406, 408, 410, 412, 414, 416, 418, 420, 422, respectively, may be 110110111. This combination may represent a specific thrust angle, a specific rail angle, and a specific seat height.

The logical values of the pins 406, 408, 410, 412, 414, 416, 418, 420, 422 may be used in any combination to represent any one or more of identifiers of users, physical characteristics of the users, or specific settings of the users.

Figure 5:
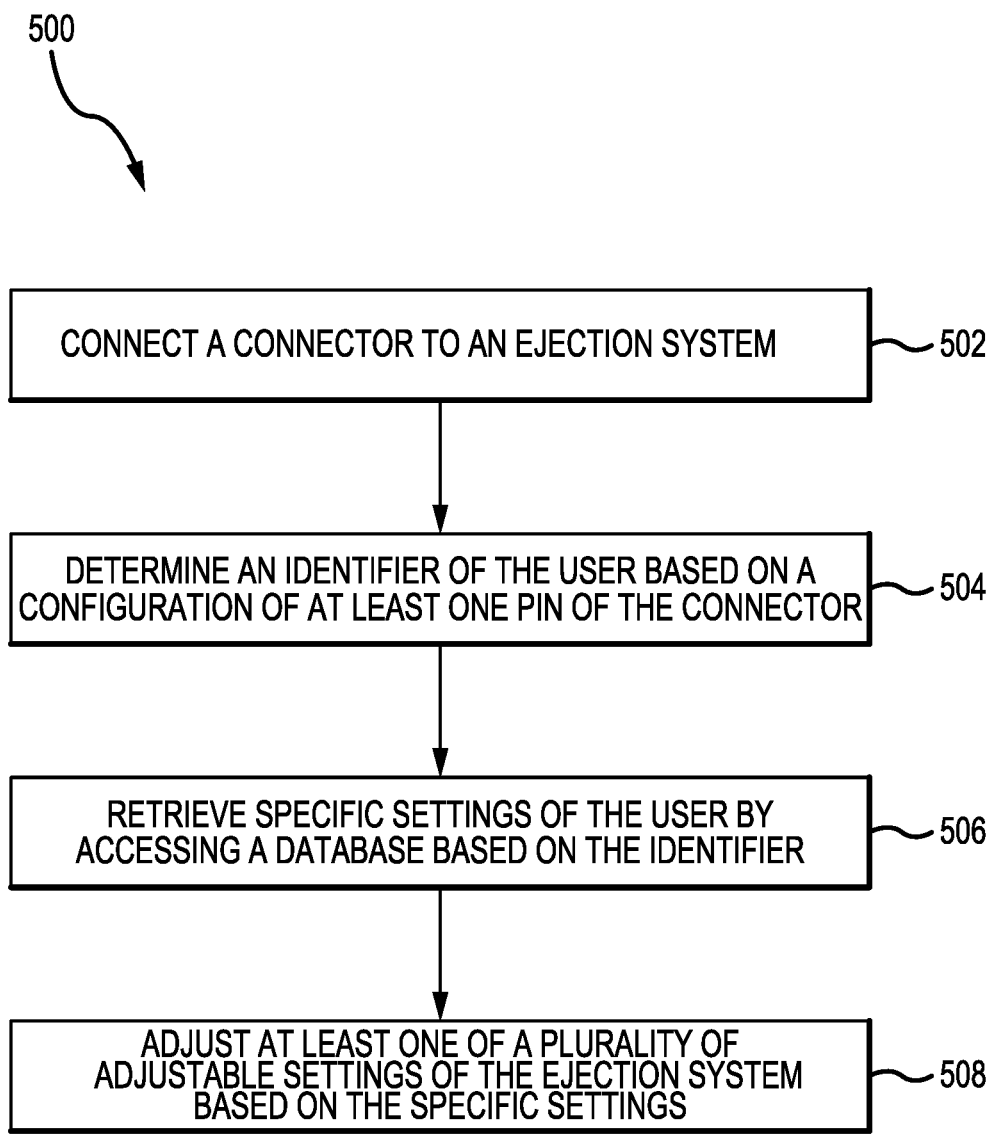
FIG. 5 is a flowchart illustrating a method for automatic adjustment of various settings of an ejection system, in accordance with various embodiments.

Referring now to FIG. 5, a flowchart illustrates a method 500 for automatic adjustment of an ejection system based on data indicated by a connector portion of a connector. The method 500 may be performed by components of a system similar to the system 300 of FIGS. 2A, 2B, 3A, and 3B. The method 500 may begin in block 502 where a connector (which may be associated with a specific user) is connected to an ejection system (which may include any component of an aircraft cockpit). For example, the connector may be connected to a helmet, a harness fitting, a communication system, an oxygen mask, or the like.

In block 504, a controller of the system may determine an identifier of the user based on the connector portion of the connector. For example, the controller may analyze a logical value represented by specific pins of a set of pins to determine the user identifier associated with the user.

In block 506, the controller may retrieve specific settings of the user corresponding to settings of an ejection system from a database using the user identifier. For example, the controller may access the database and compare the user identifier to user identifiers stored in the database, and may retrieve the specific settings associated with the user identifier.

In block 508, the controller may adjust at least one of a plurality of adjustable settings (e.g., those described above with reference to the seat electronic sequencer, the seat electronic position controller, and the interseat electronic sequencer) based on the specific settings retrieved from the database.

Figure 6:
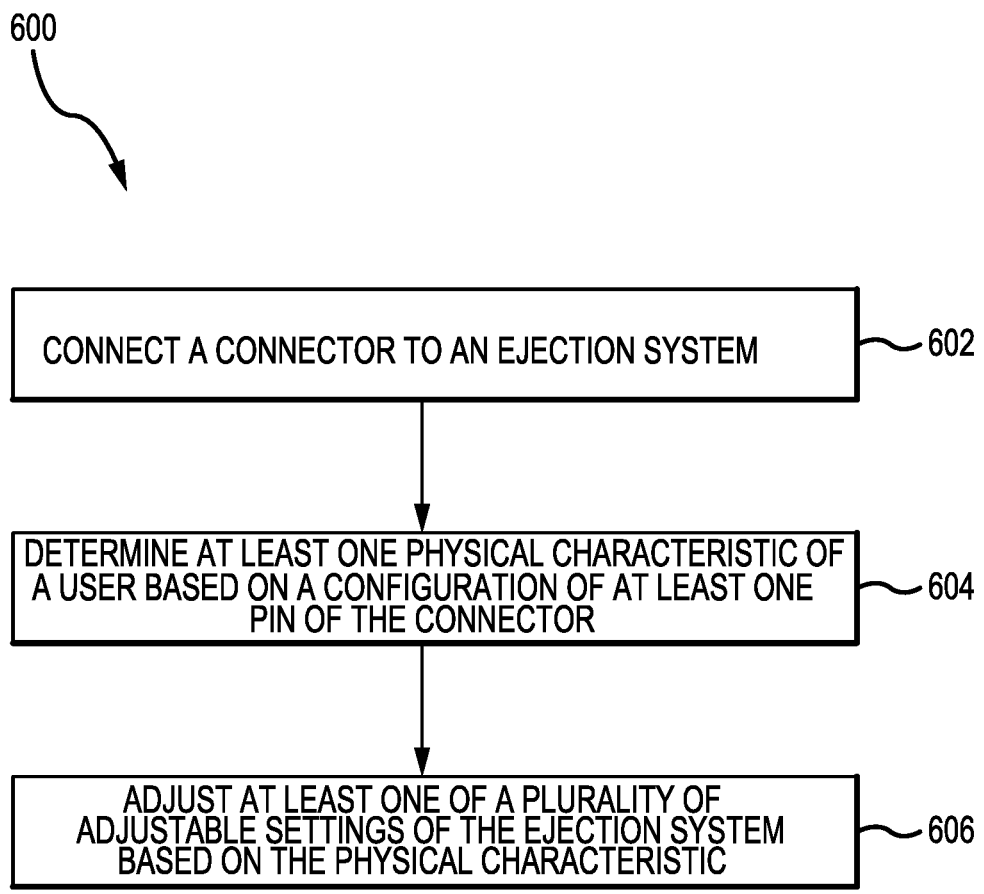
FIG. 6 is a flowchart illustrating a method for automatic adjustment of various settings of an ejection system, in accordance with various embodiments.

Referring now to FIG. 6, a flowchart illustrates a method 600 for automatic adjustment of an ejection system based on data indicated by a connector portion of a connector. The method 600 may be performed by components of a system similar to the system 300 of FIGS. 2A, 2B, 3A, and 3B. The method 600 may begin in block 602 where a connector may be connected to a portion or component of an ejection system (which may include any component or portion of a cockpit).

In block 604, a controller of the system may determine at least one characteristic of the user (e.g., a weight, a height, a distance, a center of gravity, or the like) based on the connector portion. For example, the controller may analyze a logical value represented by pins of a set of pins to determine the at least one characteristic.

In block 606, the controller may adjust at least one of a plurality of adjustable settings (e.g., those described above with reference to the seat electronic sequencer, the seat electronic position controller, and the interseat electronic sequencer) based on the at least one characteristic of the user. In various embodiments, the controller may determine optimal settings by comparing the user characteristic to a database.

Figure 7:
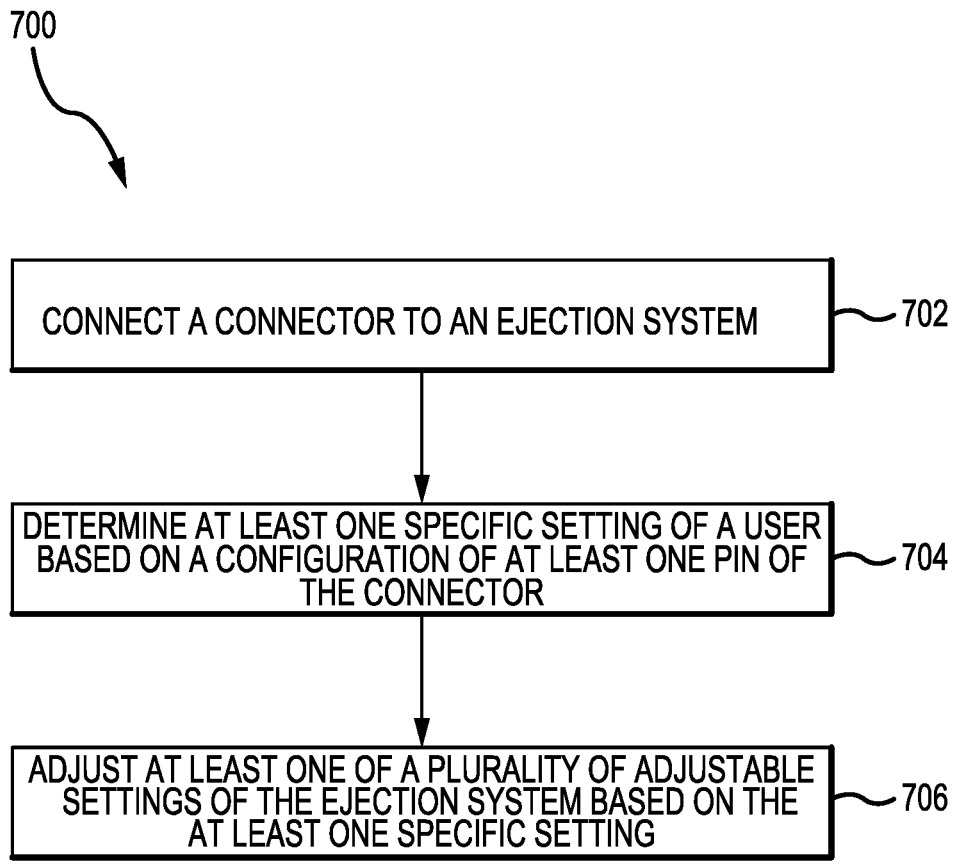
FIG. 7 is a flowchart illustrating a method for automatic adjustment of various settings of an ejection system, in accordance with various embodiments.

Turning now to FIG. 7, a flowchart illustrates a method 700 for automatic adjustment of an ejection system based on data indicated by a connector portion of a connector. The method 700 may be performed by components of a system similar to the system 300 of FIGS. 2A, 2B, 3A, and 3B. The method 700 may begin in block 702 where a connector may be connected to a portion or component of an ejection system (which may include any component or portion of a cockpit).

In block 704, a controller may determine at least one specific setting of a user based on a connector portion of the connector. For example, the controller may analyze a logical value represented by pins of a set of pins to determine the specific setting of the user.

In block 706, the controller may adjust at least one of a plurality of adjustable settings (e.g., those described above with reference to the seat electronic sequencer, the seat electronic position controller, and the interseat electronic sequencer) based on the specific settings determined by the controller.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for automatic adjustment of an ejection system for an aircraft, the system comprising:
    a connector configured to connect to a first component of the ejection system, wherein the ejection system includes a plurality of components, the plurality of components including the first component, wherein the connector comprises a connector portion that includes information corresponding to a user of the ejection system, and wherein the connector includes a plurality of pins and the connector portion includes at least one pin of the plurality of pins such that a configuration of the at least one pin indicates the information corresponding to the user; and
    a controller coupled to the ejection system and configured to adjust at least one of a plurality of adjustable settings of the ejection system based on the information corresponding to the user of the ejection system.

2. The system of claim 1, wherein the controller is configured to:
    determine an identifier of the user based on the at least one pin;
    retrieve specific settings of the user by accessing a database using the identifier; and
    adjust the at least one of the plurality of the adjustable settings based on the specific settings of the user retrieved from the database.

3. The system of claim 1, wherein the controller is configured to:
    determine at least one physical characteristic of the user based on the at least one pin; and
    adjust the at least one of the plurality of the adjustable settings based on the at least one physical characteristic of the user.

4. The system of claim 3, wherein the at least one physical characteristic includes at least one of a weight of the user, a gender of the user, a distance measurement of the user, or a location of a center of gravity of the user.

5. The system of claim 1, wherein the controller is configured to:
    determine at least one specific setting corresponding to the user based on the at least one pin; and
    adjust the at least one of the plurality of the adjustable settings based on the at least one specific setting.

6. The system of claim 1, wherein the at least one pin of the connector portion includes a set of pins such that a specific combination of logical ones and zeros corresponding to a present pin or a lacking pin, respectively, of the set of pins indicates the information corresponding to the user.

7. The system of claim 1, wherein the connector is included as a part of a portable component of the ejection system such that the connector and the portable component are transported by the user.

8. The system of claim 1, wherein the connector is configured to be used between the first component and a second component of the plurality of components such that the connector is transported by the user.

9. The system of claim 1, wherein the connector is configured for use with at least one of an oxygen mask, a helmet, a harness fitting, or a communication system.

10. The system of claim 1, wherein at least one of:
    the ejection system includes a seat electronic sequencer and the plurality of the adjustable settings include at least one of a parachute deployment timing, a drogue deployment timing, or a thrust angle alignment;
    the ejection system includes a seat electronic position controller and the plurality of the adjustable settings include at least one of a seat height, a lumbar support, a headrest position, a rail angle, or an actuator position; or
    the ejection system includes an interseat electronic sequencer and the plurality of the adjustable settings include an interseat timing.

11. A system for automatic adjustment of an ejection system for an aircraft, the system comprising:
    a connector having a plurality of pins and configured to connect to a first component of the ejection system, wherein the ejection system comprises a plurality of components, the plurality of components including the first component, wherein the connector includes a connector portion having a set of pins such that a specific combination of logical ones and zeroes corresponding to a present pin or a lacking pin, respectively, of the set of pins indicates information corresponding to a user of the ejection system; and
    a controller coupled to the ejection system and configured to adjust at least one of a plurality of adjustable settings of the ejection system based on the information corresponding to the user of the ejection system.

12. The system of claim 11, wherein the connector is configured for use with at least one of an oxygen mask, a helmet, a harness fitting, or a communication system.

13. A method for automatic adjustment of an ejection system for an aircraft, the method comprising:
    connecting a connector to a component of a plurality of components of the ejection system;
    determining, by a controller, information corresponding to a user of the ejection system based on a configuration of at least one pin of a connector portion of the connector; and
    adjusting, by the controller, at least one of a plurality of adjustable settings of the ejection system based on the information corresponding to the user of the ejection system.

14. The method of claim 13, further comprising retrieving, by the controller, specific settings of the user by accessing a database using an identifier of the user, wherein:
    determining the information corresponding to the user includes determining the identifier of the user based on the at least one pin; and
    adjusting the at least one of the plurality of the adjustable settings is based on the specific settings of the user.

15. The method of claim 13, wherein:
    determining the information corresponding to the user includes determining at least one physical characteristic of the user based on the at least one pin; and adjusting the at least one of the plurality of the adjustable settings is based on the at least one physical characteristic of the user.

16. The method of claim 13, wherein:
determining the information corresponding to the user includes determining at least one specific setting corresponding to the user based on the at least one pin; and
adjusting the at least one of the plurality of the adjustable settings is based on the at least one specific setting.

17. The method of claim 13, wherein determining the information based on the configuration of the at least one pin includes determining the information based on a specific combination of logical ones and zeros corresponding to a present pin or a lacking pin, respectively, of a set of pins of the connector portion of the connector.

18. The method of claim 13, wherein connecting the connector includes connecting the connector to at least one of an oxygen mask, a helmet, a harness fitting, or a communication system.

* * * * *